United States Patent
Carley et al.

(10) Patent No.: US 7,316,775 B2
(45) Date of Patent: Jan. 8, 2008

(54) AIR-POWERED FILTER ARRANGEMENT

(75) Inventors: Joseph C. Carley, Blacksburg, VA (US); Mark G. Agresta, Blacksburg, VA (US)

(73) Assignee: Tetra Holding (US), Inc., Blacksburg, VA (US)

( * ) Notice: Subject to any disclaimer, the term of this patent is extended or adjusted under 35 U.S.C. 154(b) by 204 days.

(21) Appl. No.: 11/000,354

(22) Filed: Nov. 30, 2004

(65) Prior Publication Data

US 2006/0113230 A1 Jun. 1, 2006

(51) Int. Cl.
*A01K 63/04* (2006.01)
(52) U.S. Cl. .................... 210/167.21; 210/167.27; 210/220; 210/416.2; 119/259
(58) Field of Classification Search ............. 210/169, 210/150, 151, 220, 221.1, 416.1, 416.2, 167.21, 210/167.22, 167.25, 167.27; 119/259–261
See application file for complete search history.

(56) References Cited

U.S. PATENT DOCUMENTS

| | | | |
|---|---|---|---|
| 2,822,925 A * | 2/1958 | Lambertson | 210/169 |
| 3,717,253 A * | 2/1973 | Lovitz | 210/167.27 |
| 4,033,719 A * | 7/1977 | Conn et al. | 250/437 |
| 4,035,298 A | 7/1977 | Cloke et al. | |
| 4,035,299 A | 7/1977 | Vroeginday | |
| 4,064,837 A * | 12/1977 | Montgomery | 119/248 |
| 4,385,989 A * | 5/1983 | Margolis | 210/169 |
| 4,602,996 A * | 7/1986 | Willinger | 210/136 |
| 4,620,924 A | 11/1986 | Goldman et al. | |
| 4,753,723 A | 6/1988 | Willinger | |
| 4,880,549 A | 11/1989 | Willinger et al. | |
| 4,997,559 A | 3/1991 | Ellis et al. | |
| 5,139,659 A | 8/1992 | Scott | |
| 5,188,516 A | 2/1993 | Huang | |
| 5,290,436 A * | 3/1994 | Danner | 210/169 |
| 5,603,831 A * | 2/1997 | Hickok | 210/601 |
| 6,523,498 B1 | 2/2003 | Shyu | |
| 6,797,163 B2 | 9/2004 | Carley et al. | |
| 2003/0183571 A1 * | 10/2003 | Carley et al. | 210/435 |

FOREIGN PATENT DOCUMENTS

| | | | |
|---|---|---|---|
| JP | 1-164410 | * | 6/1989 |
| SU | 1746965 | * | 7/1992 |

OTHER PUBLICATIONS

"Fishease keeping fish with ease™," *Jonas Works, Inc.*, http://www.jonasworks.com/ (Date: Publicly known prior to the filing date of the present application).

"Penn-Plax Aquarium Products," *PennPlax, Inc.*, http://www.pennplax.com/Pages/Aqua.pages.../Aqua21F.html, 4 pages (Date: Publicly known prior to the filing date of the present application).

"SUISAKU News," *Suisaku*, http://www.suisaku.com/, 8 pages (Date: Publicly known prior to the filing date of the present application).

* cited by examiner

*Primary Examiner*—Fred G. Prince
(74) *Attorney, Agent, or Firm*—Merchant & Gould P.C.

(57) ABSTRACT

A filter including a filter housing having a spillway and a pneumatic intake assembly that draws water from an aquarium into the filter housing. The filter housing being configured to internally mount to the aquarium. The filter housing having first and second chamber oriented in a side-by-side arrangement such that water flows in a generally horizontal direction through a filter cartridge positioned between the first and second chambers.

25 Claims, 4 Drawing Sheets

AIR-POWERED FILTER ARRANGEMENT

TECHNICAL FIELD

This disclosure relates generally to methods and devices for filtering water. More particularly, this disclosure relates to an air-powered filter for filtering aquarium water.

BACKGROUND

Filters are used in aquariums to remove particulate matter from the aquarium water in order to keep the aquarium clean. Several types of filters exist, including externally mounted filters and internally mounted filters.

Externally mounted filters are primarily located outside of an aquarium. These filters typically hang over a top edge of the aquarium. A siphon tube carries water from the aquarium to a filter box that hangs along an outer side of the aquarium. Water entering the filter box flows over various types of filter media to filter and remove water contaminants. The filtered water is then pumped back into the aquarium by a water pump, for example.

Internally mounted filters are primarily located inside an aquarium. These filters typically mount such that the filter box is at least partially submerged within the aquarium. Some internally mounted filters include a built-in water pump; others include a pneumatic pump. Internally mounted filters having a built-in water pump typically draw water into the bottom of the filter box, direct the water flow through filter media, and then pump the filtered water out of the filter box back into the aquarium. Internally mounted filters having a pneumatic pump typically include a lift tube that directs the flow of water into an upper water chamber of the filter box. From the upper water chamber, the water percolates downward through the filter media and flows back into the aquarium.

In general, improvement has been sought with respect to such filter arrangements, generally to provide better water circulation within the aquarium, increase cost-effective operation, and accommodate ease of use.

SUMMARY

The present disclosure relates to a filter arrangement and methods concerning the filter arrangement. The filter arrangement includes a housing, a filter cartridge, and an intake assembly. The housing and filter cartridge define first and second water chambers. During operation, water is carried by the intake assembly into the first chamber, urged through the filter cartridge into the second chamber by gravity feed, and returned to the aquarium via a spillway.

A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

DETAILED DESCRIPTION

Figure 1:
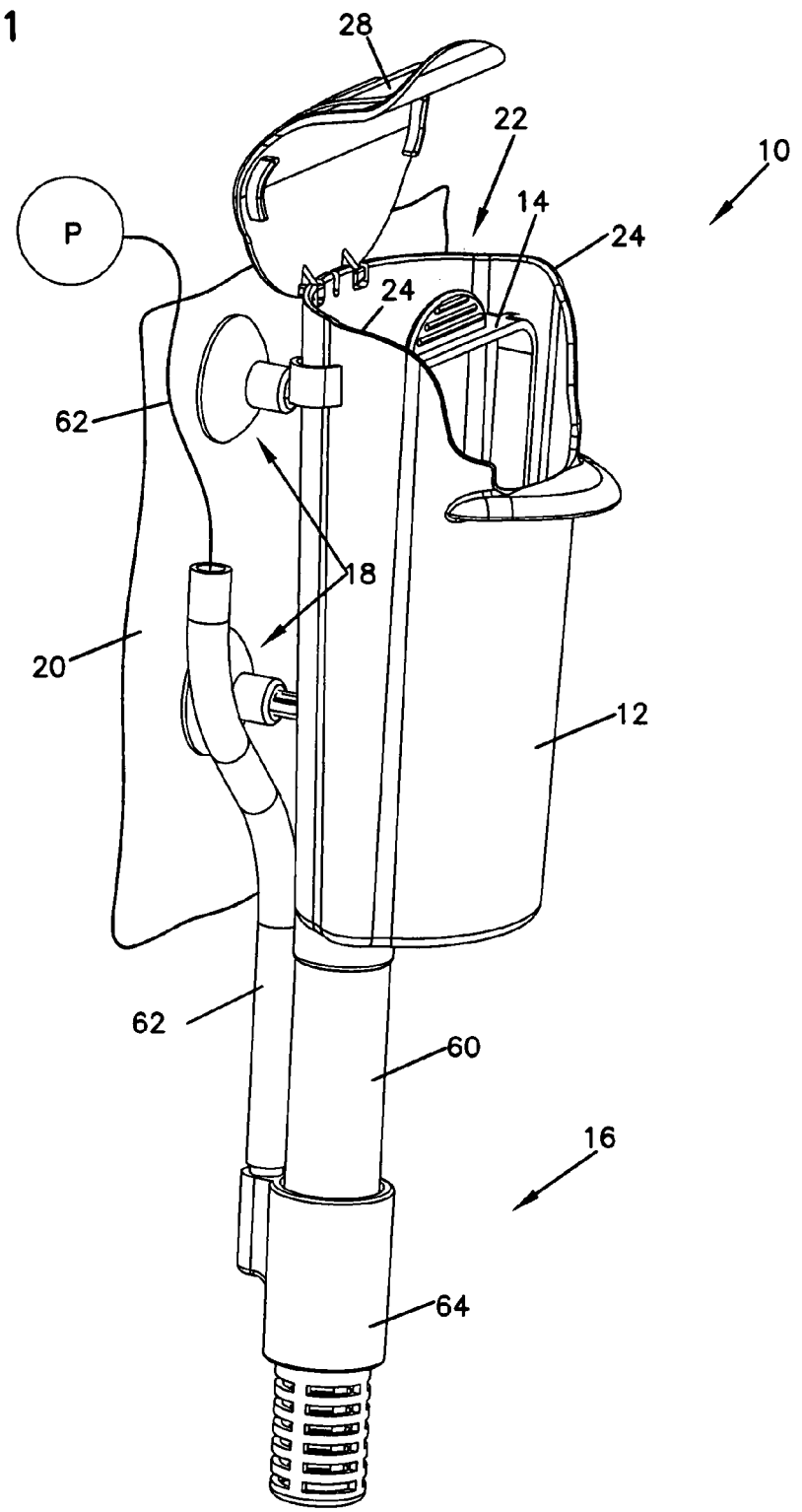
FIG. 1 is a perspective view of an embodiment of a filter arrangement in accordance with the principles of the present disclosure.

Reference will now be made in detail to various features of the present disclosure that are illustrated in the accompanying drawings. Wherever possible, the same reference numbers will be used throughout the drawings to refer to the same or like parts.

FIGS. 1-4 illustrate a filter arrangement 10 having features that are examples of how inventive aspects in accordance with the principles of the present disclosure may be practiced. In general, the filter arrangement 10 includes a filter box or housing 12, a removable filter cartridge 14, and an intake assembly 16. The filter arrangement 10 also includes mounting structure 18 that mounts the housing 12 internally or inside an aquarium 20 (aquarium only partially shown).

Figure 2:
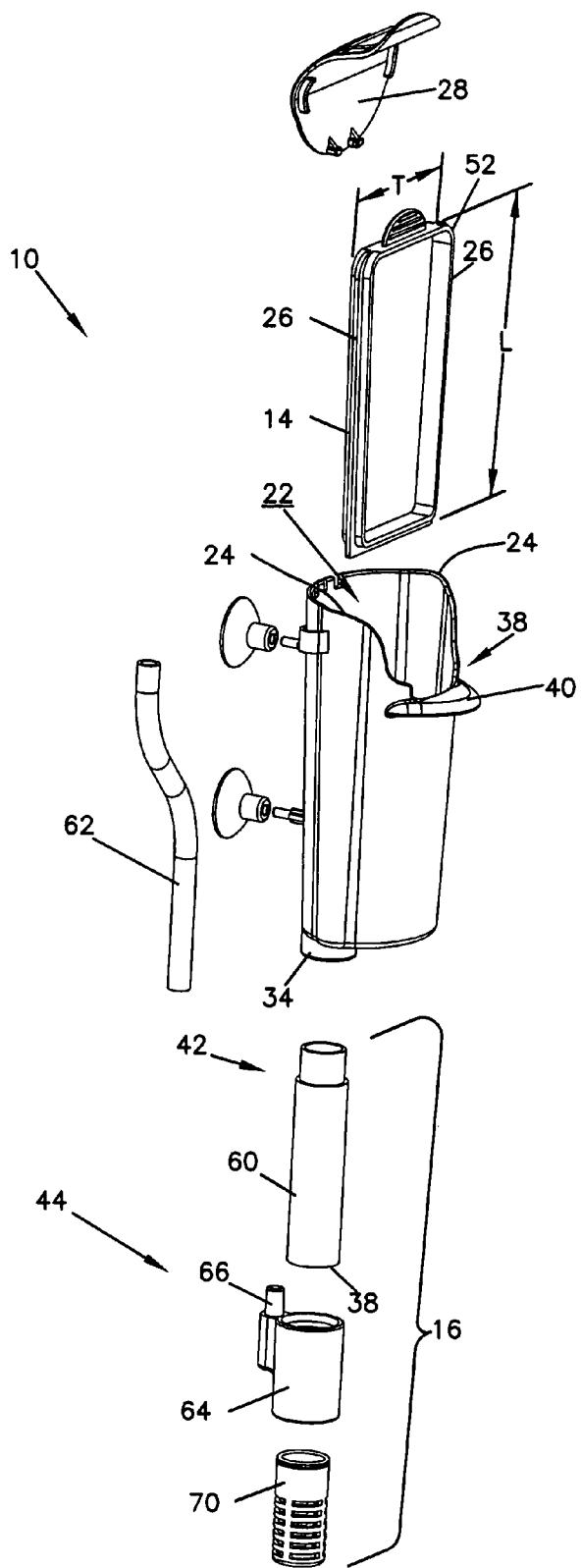
FIG. 2 is an exploded view of the filter arrangement of FIG. 1.
Figure 3:
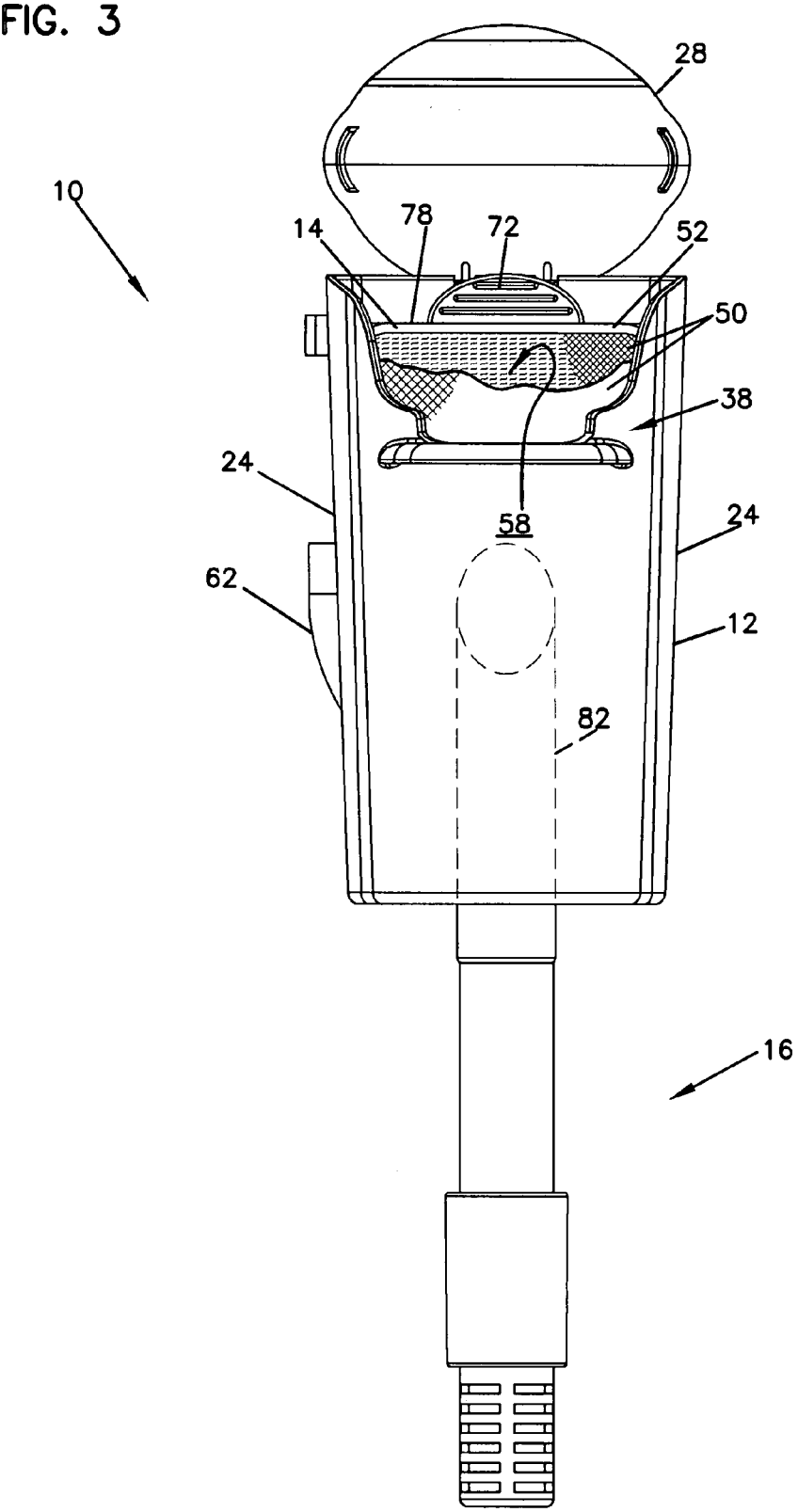
FIG. 3 is a front elevation view of the filter arrangement of FIG. 1.

Referring to FIGS. 1 and 2, the housing 12 of the filter arrangement 10 defines an interior 22 configured to receive the filter cartridge 14. In the illustrated embodiment, the housing 12 has a somewhat elliptic shape. Channels 24, defined generally by the apexes of the elliptic-shaped housing, retain edges 26 of the filter cartridge 14 to secure the filter cartridge 14 in a substantially vertical orientation (see also FIG. 3). By this arrangement, the filter cartridge 14 simply slides within the channels 24 into a seated position within the interior 22 of the housing 12, and is retained in the vertical orientation by the shaped construction of the housing. In an alternative embodiment, guide rails, integral slots, or other structure may be formed in housings having other shapes to maintain placement of the filter cartridge within the filter housing. In the illustrated embodiment, the filter arrangement 10 also includes a hinged cover 28. The hinged cover 28 is configured to pivot to enclose the interior 22 of the housing 12, and provide easy access to the filter cartridge 14 for maintenance.

Figure 4:
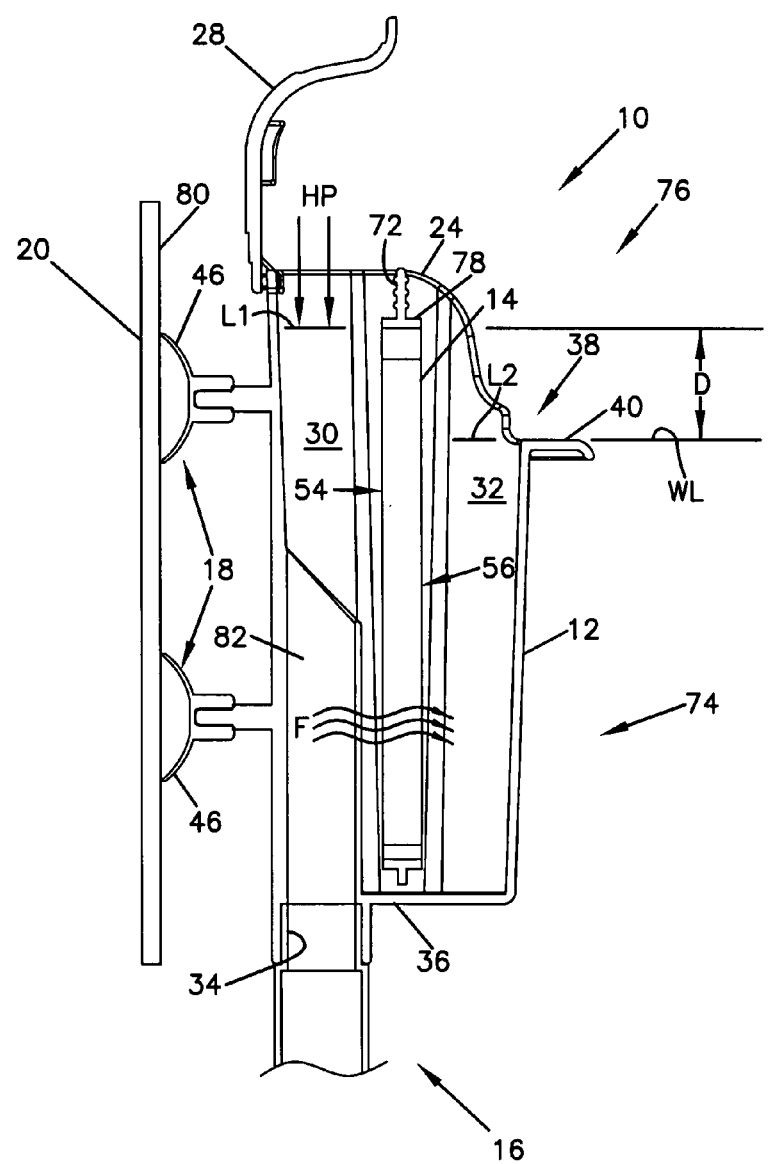
FIG. 4 is a partial, side sectional view of the filter arrangement of FIG. 1.

Referring now to FIG. 4, the filter cartridge 14 of the present disclosure is arranged to divide the interior 22 (FIG. 1) of the housing 12 into first and second chambers 30, 32 when positioned within the channels 24 of the housing 12. The filter cartridge 14 has a generally rectangular construction defining a longitudinal dimension L (FIG. 2) and a transverse dimension T. The longitudinal dimension is generally vertically oriented when the filter cartridge 14 is operably positioned within the filter housing 12. The filter cartridge 14 is operably positioned when seated or installed within the interior 22 to define first and second filter chambers 30, 32 of the housing 12. A handling structure 72 is provided for ease in installing or removing the filter cartridge 14 from the housing 12. In the illustrated embodiment, the handling structure 72 is located along a top portion 78 of the frame 52.

The filter cartridge 14 includes filter media 50 (shown partially in FIG. 3) secured to a frame 52. The filter media 50 of the filter cartridge 14 can include floss material, for example, secured to the frame 52 to define first and second sides 54, 56 (FIG. 4). In some embodiments, the floss material defines an interior 58 within which other filtering media, such as charcoal, can be located. One example of a filter cartridge that can be used in accord with the principles disclosed is Filter Cartridge Model No. 26042-600 sold by Tetra. Other types of filter cartridges and filtering media can also be used.

Still referring to FIG. 4, the first chamber 30 of the housing 12 is a water intake chamber interconnected to the intake assembly 16 by an aperture 34 formed in the housing 12. The aperture 34 is located at a bottom 36 of the housing 12 in the water intake chamber 30. In the illustrated embodiment, a tube extension 82 (see also FIG. 3) is interconnected to the aperture 34 of the housing. The aperture 34 and the tube extension 82 provide fluid communication between the intake assembly 16 and the water intake chamber 30. During filtration, water is drawn through the intake assembly 16, and through the aperture 34 and tube extension 82 to fill the water intake chamber 30.

The second chamber 32 is a water output chamber. During filtration, water flow from the water intake chamber 30, through the filter cartridge 14 and into the water output chamber 32. The filter housing 12 has a spillway 38 located adjacent to the water output chamber 32 to provide fluid communication between the water output chamber 32 and the aquarium 20. The spillway 38 includes a lip 40 that extends outward from the housing 12. During filtration, water runs over the lip 40 of the spillway 38 and is returned to the aquarium 20 from the water output chamber 32.

The water intake chamber 30 and the water output chamber 32 are oriented in a side-by-side relationship relative to one another. During filtration, water is urged through the filter cartridge 14 located between the side-by-side chambers 30, 32 in a generally horizontal direction (as represented by arrows F). In particular, head pressure (represented by arrows HP) from the water column contained within the filled water intake chamber 30 urges the unfiltered water through the filter cartridge 14 in the generally horizontal direction. The filtered water then enters and fills the output water chamber 32, and from there is returned to the aquarium via the spillway 38. The filter arrangement 10 is a gravity feed or gravity filtering arrangement. A gravity feed arrangement uses gravity (head pressure) to create the flow of water through the filter cartridge; in contrast to an arrangement that uses a pump or siphon to push or pull water through a filter cartridge.

In contrast to the disclosed side-by-side chamber arrangement, some conventional arrangements have a top-to-bottom chamber arrangement. In such arrangements, a top chamber is located above a filter medium. During filtration, water enters the top chamber and percolates downward through the filter medium in a generally vertical direction. Because of the top-to-bottom flow arrangement, the advantages of a spillway cannot be provided unless a majority of the conventional filter housing is located above and over the water surface of an aquarium.

For instance, to accommodate a spillway in a top-to-bottom flow arrangement, the top filter chamber, filter medium, and the bottom filter chamber must be located above the water in an aquarium if the filtered water is to exit a spillway from the bottom filter chamber. This type of arrangement is less aesthetically pleasing as a majority of the filter housing is in direct view of a user. The side-by-side chamber arrangement of the present filter arrangement 10 combines the advantages of the spillway with a gravity-filtering arrangement, while providing a less conspicuous, submersible housing. Yet also, the present filter arrangement 10 is configured and arranged to permit a user to replace or install the filter cartridge 14 without getting one's fingers or hands wet (discussed in greater detail hereinafter).

Referring back to FIG. 1, the intake assembly 16 of the filter arrangement 10 is air-powered. That is, water flows through the filter arrangement 10 without the use of a water pump. Rather, the intake assembly 16 is interconnected to a pneumatic pump P (schematically represented) located external to the aquarium. The pneumatic pump P supplies air to the intake assembly 16 to draw water through the assembly 16 and fill the water intake chamber 30 of the housing 12.

The intake assembly 16 generally includes a first end 42 that couples with the aperture 34 formed in the housing 12, and a second opposite end 44 that is submerged in the aquarium during operation. In the illustrated embodiment, the intake assembly 16 includes a lift tube 60 and a diffuser piece 64. The lift tube 60 of the intake assembly 16 extends downward from the aperture 34 of the filter housing 12. The diffuser piece 64 is coupled to an end 68 (FIG. 2) of the lift tube 60. Air from the pneumatic pump P is supplied to the lift tube 60 of the intake assembly 16 via an airline 62 that attaches to the diffuser piece 64. As shown in FIG. 2, the airline 62 attaches to a nozzle 66 of the diffuser piece 64. The nozzle 66 is sized to provide a sealed connection between the airline 62 and the diffuser piece.

In use, the filter arrangement 10 mounts within an aquarium 20 such that the filter housing 12 is partially submerged within the aquarium water. The filter arrangement 10 illustrated is sized and configured to mount within an aquarium having a capacity between approximately 1 gallon and 3 gallons; although other embodiments can be adapted for use within larger or smaller aquariums. In the embodiment illustrated in FIG. 4, the mounting structure 18 of the filter arrangement 10 includes suction components 46 that mount the housing directly to an inner sidewall 80 of the aquarium 20. Other mounting configurations, such as bottom surface mounting structure, for example, are contemplated. Preferably, the filter arrangement 10 is mounted so that the spillway 38 of the housing 12 is at or above a waterline WL of the aquarium. The housing 12 of the filter arrangement 10 is thereby only partially submersed such that a bottom region 74 of the housing 12 is located below the waterline WL of the aquarium 20 and a top or upper region 76 of the housing is located above the waterline WL.

In operation, air from the airline 62 is pumped through the diffuser piece 64 and enters the lift tube 60. In the lift tube 60, the air or air bubbles rise upward toward the surface of the water. As the air bubbles rise, the dynamic movement of the air bubbles causes water to be drawn in through the end 44 of the intake assembly 16, and upward through the lift tube 60 with the air bubbles. In the illustrated embodiment, the tube extension 82 located within the housing 12 functions to lengthen the overall rise distance of the air bubbles. That is, the tube extension 82 acts as an extension of the lift tube 60. The increased rise distance of the air bubbles provided by the tube extension 82 increases the water flow momentum through the lift tube 60 and the tube extension 82, and thereby increases the rate of water flowing through the filter arrangement 10.

In some embodiments, the diffuser piece 64 may include structure (not shown) located within the nozzle 66 to break up the air and create a greater amount of bubbles than what is naturally formed by the nozzle. Increasing the amount of bubbles increases the dynamic movement; and thereby increases the rate of water flow through the intake assembly 16.

In the illustrated embodiment, the intake assembly 16 includes a filtering grid 70 located at the second end 44 of the assembly. The filtering grid 70 functions as a fish guard and/or prevents larger objects from being drawn into the intake assembly 16 of filter arrangement 10.

Unfiltered water is drawn from the aquarium through the intake assembly 16, and rises to a first water level L1 (FIG. 4) within the water intake chamber 30 of the housing 12. Head pressure HP from the column of unfiltered water in the water intake chamber 30 urges the water through the filter cartridge 14 and into the water output chamber 32. The filter waters then rises within the water output chamber 32 to a second water level L2 at which filtered water begins to spill over the spillway 38 of the housing 12 and back into the aquarium 20. The waterflow arrangement of the disclosed filter arrangement 10 accordingly has a bottom-entry intake flow and a top-exit output flow.

The first water level L1 of the water intake chamber 30 is designed to rise above the second water level L2 of the water output chamber 32. The water level W1 attained in the water intake chamber 30 is determined by factors such as water intake rate, filter density, and location of the spillway 38. The spillway 38 defines the second water level L2 of the water output chamber 32. The spillway 38 is located in relation to the water level W1 attained in the water intake chamber 30 so that the water column in the water intake chamber 30 exceeds the water column in the water output chamber 32. Thereby, water flows through the filter cartridge 14 by gravity feed or head pressure attributable to a differential D (FIG. 4) between the water levels W1, W2 in the water intake and output chambers 30, 32. Preferably, the differential D between the water level W1 behind or at the first side 54 of the filter cartridge 14 (i.e. within the intake chamber 30) and the water level W2 in front or at the second side 56 of the filter cartridge (i.e. within the output chamber 32) generates a generally constant flow rate through the filter cartridge 14.

In conventional internal filter arrangements, the water is typically either pushed or pulled through the filter media rather than having a flow directed by gravity feed. One advantage of the present gravity feed arrangement is that power to push or pull water through filter media is not required.

In addition to the features previously discussed, several features relating to maintenance are provided by the presently disclosed filter arrangement 10. For instance, because the housing 12 is only partially submerged within the aquarium water, a user can easily access the interior 22 of the housing 12 without contacting the water. Also, a portion (i.e. the handling structure 72) of the filter cartridge 14 extends above the water levels W1, W2 within the interior of the housing; accordingly, the user can easily maintain or replace the filter cartridge 14 of the filter arrangement 10 without contacting or reaching into the water.

Yet another feature of the present disclosure relates to events where the filter cartridge becomes too clogged to permit water to filter through. The present filter arrangement 10 is designed so that water backing up within the water intake chamber 30 will flow over the top portion 78 of the filter cartridge 14 and into the water output chamber 32. By this arrangement, water circulation can continue within the aquarium during periods of time when the user is unable to maintenance or replace a clogged filter cartridge.

The above specification provides a complete description of the invention. Since many embodiments of the invention can be made without departing from the spirit and scope of the invention, certain aspects of the invention reside in the claims hereinafter appended.

What is claimed is:

1. A filter, comprising:
   a filter housing configured to mount internally to an aquarium;
   a removable filter cartridge positioned within the filter housing, the filter cartridge defining first and second chambers within the filter housing, the first and second chambers being oriented in a side-by-side arrangement; and
   a pneumatic intake assembly arranged to fill the first chamber of the filter housing with unfiltered water, the unfiltered water reaching a first water level during operation of the filter;
   wherein during operation water flows from the first chamber, through the filter cartridge, and into the second chamber only by gravity feed and without use of a water pump.

2. The filter of claim 1, wherein the pneumatic intake assembly includes a lift tube extending from the filter housing, the lift tube being in fluid communication with the first chamber to provide fluid flow from the aquarium to the first chamber.

3. The filter of claim 2, wherein the lift tube extends from an aperture formed in the bottom of the filter housing.

4. The filter of claim 1, wherein the filter housing includes a spillway, the spillway providing fluid communication between the second chamber and the aquanum.

5. The filter of claim 4, wherein the spillway defines a second water level provided in the second chamber during operation of the filter.

6. The filter of claim 5, wherein the first water level of the first chamber is greater than the second water level of the second chamber during operation of the filter.

7. The filter of claim 5, wherein water flows through the filter cartridge by gravity feed attributed to a differential of water levels in the first and second chambers.

8. The filter of claim 1, wherein a portion of the filter cartridge extends above the first water level in the first chamber.

9. A filter, comprising:
   a filter housing configured to mount internally to an aquarium;
   a removable filter cartridge positioned within the filter housing, the filter cartridge defining first and second chambers within the filter housing; and
   a pneumatic intake assembly arranged to create fluid flow from the aquarium to the first chamber to fill the first chamber with unfiltered water, the unfiltered water reaching a first water level during operation of the filter;
   wherein only head pressure from the unfiltered water is utilized to generate fluid flow through the filter cartridge, the head pressure urging the unfiltered water through the filter cartridge in a generally horizontal direction.

10. The filter of claim 9, wherein the filter cartridge has a longitudinal dimension that is vertically oriented when the filter cartridge is operably positioned within the filter housing.

11. The filter of claim 9, wherein the pneumatic intake assembly includes a lift tube extending from an aperture formed in the bottom of the filter housing.

12. The filter of claim 9, wherein the filter housing includes a spillway, the spillway providing fluid communication between the second chamber and the aquarium.

13. The filter of claim 12, wherein the spillway defines a second water level provided in the second chamber during operation of the filter.

14. The filter of claim 9, wherein a portion of the filter cartridge extends above, the first water level in the first chamber.

15. The aquarium of claim 9, wherein the first and second chambers are oriented in a side-by-side arrangement.

16. A filter, comprising:
   a filter housing configured to mount inside an aquarium such that a bottom region of the filter housing is located below a waterline of the aquarium and a top region of the filter housing is located above the waterline of the aquarium;
   a removable filter cartridge positioned within an interior of the filter housing; and
   a pneumatic intake assembly interconnected to the filter housing, the pneumatic intake assembly being arranged to create fluid flow from the aquarium to the filter housing, the pneumatic intake assembly including a lift tube that extends from an aperture formed in the bottom of the filter housing;
   wherein aquarium water enters the filter housing at the bottom region and exits the filter housing at the top region.

17. The filter of claim 16, wherein the filter cartridge defines first and second filter housing chambers when positioned within the filter housing.

18. The filter of claim 16, wherein the filter housing includes a spillway, the spillway providing fluid communication between the second filter housing chamber and the aquarium.

19. The filter of claim 16, wherein during operation, a first water level is provided in the first filter housing chamber and a second water level is provided in the second filter housing chamber, the first water level being greater than the second water level such that water flows through the filter cartridge from the first filter housing chamber to the second filter housing chamber.

20. The filter of claim 16, wherein water is urged through the filter cartridge by head pressure created in the first filter housing chamber.

21. The filter of claim 16, wherein a portion of the filter cartridge extends above the first water level in the first filter housing chamber.

22. The filter of claim 16, wherein the filter cartridge has a longitudinal dimension that is vertically oriented when the filter cartridge is operably positioned within the filter housing.

23. An aquarium arrangement, comprising:
   an aquarium configured to hold water;
   a filter mounted to the aquarium, the filter including:
      a filter housing having a lower region located below a waterline of the aquarium and an upper region located above the waterline of the aquarium;
      a removable filter cartridge positioned within the filter housing, the filter cartridge defining first and second chambers within the filter housing, the first and second chambers being oriented in a side-by-side arrangement; and
      a pneumatic intake assembly arranged to create fluid flow from the aquarium to the first chamber to fill the first chamber with unfiltered water, the unfiltered water reaching a first water level during operation of the filter, the first water level of the first chamber being located above the waterline of the aquarium;
   wherein a portion of the filter cartridge is located above the first water level; and
   wherein water flows through the filter cartridge only by gravity feed attributed to a differential of water levels in the first and second chambers.

24. The aquarium of claim 23, wherein the filter includes a spillway that provides fluid communication between the second chamber and the aquarium, the spillway being positioned at or above the waterline of the aquarium.

25. The aquarium of claim 23, wherein the spillway defines a second water level provided in the second chamber during operation of the filter.

* * * * *